United States Patent
Rokitansky

Patent Number: 5,483,648
Date of Patent: Jan. 9, 1996

[54] CIRCUIT FOR DETERMINING THE ARRIVAL TIMES OF CONTROL SIGNALS SUPPLIED TO MICROPROCESSORS

[75] Inventor: Walter Rokitansky, Munich, Germany

[73] Assignee: Siemens Aktiengesellschaft, Munich, Germany

[21] Appl. No.: 292,041

[22] Filed: Aug. 18, 1994

[30] Foreign Application Priority Data

Aug. 30, 1993 [DE] Germany ............. 43 29 153.8

[51] Int. Cl.⁶ ............................................. G06F 1/14
[52] U.S. Cl. .............. 395/550; 364/270; 364/270.3; 364/270.6; 364/DIG. 1
[58] Field of Search ..................... 395/550, 725; 364/270, 270.3, 270.6

[56] References Cited

U.S. PATENT DOCUMENTS

| | | | |
|---|---|---|---|
| 4,161,787 | 7/1979 | Groves et al. | 395/550 |
| 4,222,103 | 9/1980 | Chamberlin. | |
| 5,218,692 | 6/1993 | Yamada et al. | 395/550 |
| 5,218,693 | 6/1993 | Ogita. | |
| 5,233,573 | 8/1993 | Bettelheim et al. | 395/550 |

OTHER PUBLICATIONS

Data Sheet for Intel, 82C54 "CHMOS Programmable Interval Timer", Oct. 1987, pp. 2–46–2–62.

*Primary Examiner*—Kevin A. Kriess
*Assistant Examiner*—Dennis M. Butler
*Attorney, Agent, or Firm*—Hill, Steadman & Simpson

[57] ABSTRACT

A circuit for determining the arrival times of control signals supplied to microprocessors is disclosed which eliminates the error caused by the interrupt delay. Additional counters are employed to eliminate the errors caused by the delay between the receipt of a control signal by a microprocessor and the corresponding output of a read command requesting the momentary reading of a first counter occurs. A second counter is used to eliminate the interrupt delay error by counting clock pulses from the arrival of the control signal until the read command is received. The counter reading from the second counter is subtracted from the first counter to determine the actual arrival time of the control signal.

9 Claims, 1 Drawing Sheet

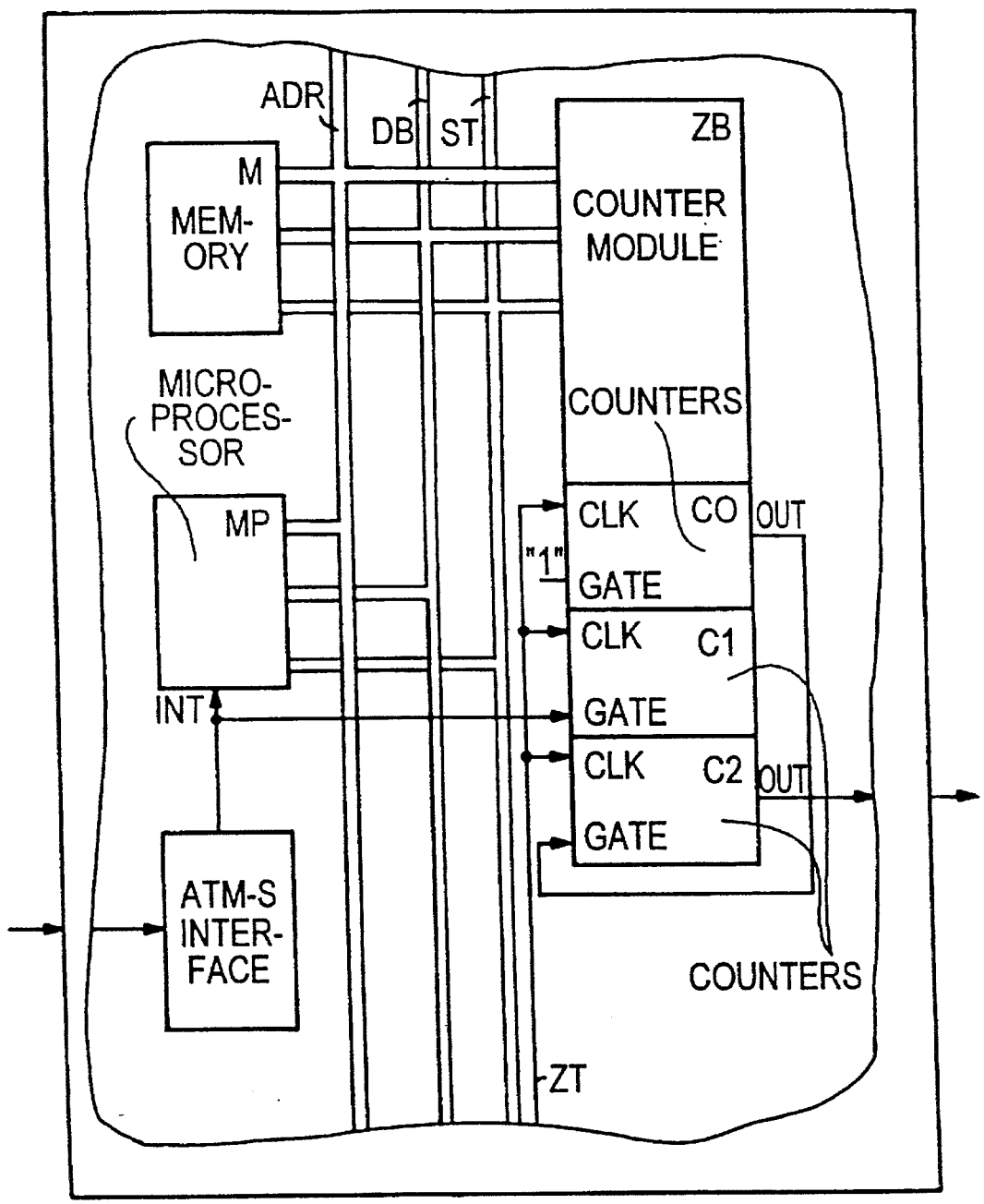

CIRCUIT FOR DETERMINING THE ARRIVAL TIMES OF CONTROL SIGNALS SUPPLIED TO MICROPROCESSORS

BACKGROUND OF THE INVENTION

FIELD OF THE INVENTION

The present invention relates to a microprocessor control signal timing circuit and, more particularly, this invention relates to a circuit for more accurately determining the arrival times of control signals supplied to microprocessors.

A problem arises in microprocessors when a relatively long time span passes from the arrival of a control signal which triggers an interrupt of the microprocessor until the output of a read command requesting the momentary counter reading of a first counter occurs. This is due to the interrupt delay time which may vary depending on the momentary load of the microprocessor. When such a delay occurs, the reading from the first counter no longer corresponds with the momentary counter reading at the point in time at which the control signal originally appeared. This occurs most frequently when successive control signals appear with a high repetition rate and may result in high rates of error.

It is thus an object of the present invention to provide a circuit which more accurately determines the arrival times of control signals in microprocessors to eliminate these errors.

SUMMARY OF THE INVENTION

The present invention employs the use of additional counters to more accurately determine the arrival times of control signals supplied to microprocessors with limited circuitry. A second counter is used to eliminate errors in the momentary counter reading of the first counter caused by the interrupt delay time. A third counter is employed as a clock control whose output can be controlled depending upon the phase relationship based on control of the microprocessor. In a preferred embodiment, the counters are incorporated into an integrated counter module which is connected to the bus system of the microprocessor. The counters are independently programmable to provide the desired type of counting operation.

BRIEF DESCRIPTION OF THE DRAWINGS

FIG. 1 illustrates a block diagram of a microprocessor circuit which incorporates the present invention.

DESCRIPTION OF THE PREFERRED EMBODIMENT

FIG. 1 illustrates only those portions of the microprocessor circuit which are necessary for understanding the present invention. In the example of the preferred embodiment, the microprocessor MP receives synchronization pulses from synchronization cells transmitted within an ATM communication system operating in an asynchronous transfer mode. These synchronization cells are inserted into the message cell streams at prescribed intervals within the ATM communication system. In the example of the preferred embodiment the interval is selected to be 23.5 mS.

The microprocessor circuit of the present invention employs a microprocessor MP such as an Intel 80186, manufactured by Intel Corp. of Santa Clara, Calif., which is connected via an interrupt input INT to an interface ATM-S. A memory M which contains programs required for operation of the microprocessor MP, and a counter module ZB, such as, for example, the 82C54 counter module manufactured by Intel Corp. are connected to the bus system of the microprocessor. The bus system includes an address bus ADR, a data bus DB, and a control bus ST. The counter module ZB is described in greater detail in the data book, "Microprocessor and Peripheral Handbook, Vol. 1, Microprocessors," 1988, pages 2-46 through 2-63. The counter module ZB contains three counter devices which are programmable independently of one another. The separate counters are referenced C0, C1 and C2 respectively in FIG. 1. In the example of the preferred embodiment, counter C0, is programmed to operate as a free wheeling circulating memory for the microprocessor MP. Mode 2 (the "rate generator") described in the above-referenced data book is used for this counting operation. The "gate" input of counter C0 receives logical level "1" (VCC) and its CLK input receives a clock pulse sequence. The repetition rate of the clock pulse in the exemplary embodiment is at a frequency of 2,048 MHz.

The counter device C1, is operated as a triggerable counter, mode 1 (the "hardware triggered one-shot") recited in the above-referenced data book. Counter C1 is driven into a counting cycle only in response to the receipt of a control signal at its "gate" input. The value FFFF (H) is selected as the initial counter reading for its counting cycle. This counter is also supplied with the above-mentioned clock pulse at its CLK input. The control input "gate" of counter C1 is directly connected to interface ATM-S.

The counter device C2, which is also supplied with the clock pulse sequence at its CLK input, is operated in mode 3 (the "square wave mode") as set forth in the above-mentioned data book. For control, its corresponding input "gate" is connected to the counter output OUT of the counter device C0. In this setup, 48, 128 (D) is selected as the count period in the example of the preferred embodiment. Operation of this microprocessor circuitry is discussed in greater detail below.

The appearance of synchronization cells within a message cell stream is continuously monitored by the interface ATM-S. The synchronization cells generally appear at intervals of 23.5 mS, however, fluctuations in transit time caused by the asynchronous transfer mode can occur, thus altering the interval. In response to the appearance of each synchronization cell, the interface ATM-S generates a control signal which is supplied to the microprocessor MP as an interrupt signal and to the counter device C1, as a trigger signal. The appearance of this control signal sets the counter device C1, into its counting mode wherein the counter device C1 proceeds from the initial counter reading and continuously modifies its momentary counter reading in accordance with the received clock pulse sequence. The operating program that is currently running at the moment is interrupted by the microprocessor MP in response to receiving the operating control signal and a read command "read-back command" according to the above-referenced data book) is output to the counter module ZB via the bus system during the interrupt routine. Depending on the operating program running at this time and, thus also dependent on the momentary load of the microprocessor MP, this read command thereby only appears after what is referred to as an interrupt delay time, which varies from interrupt to interrupt. Typical interrupt delay times, for the above referenced microprocessor are on the order of 50–100 μs.

When the counter module ZB receives the read command, the momentary counter readings of the two counting devices C0 and C1 are stored in an intermediate register allocated to one of the respective counter devices and are retained therein without interrupting the respective counting operation. These momentary counter readings are subsequently read by the microprocessor MP to determine the arrival time of the control signal and thus identify the synchronization cell which caused the interrupt of the microprocessor. As a result of the delay time, the stored momentary counter reading of the counter device C0 therefore does not correspond with the momentary counter reading at the actual arrival time of the control signal (a measuring error is initially present). Because the interrupt delay time is measured by the momentary counter reading of the counter device C1, the momentary counter reading of the counter device C1 is subtracted from the momentary counter reading of the counter device C0 in order to precisely determine the arrival time of the control signal. Accurate determination of the arrival time of the control signal has thus been accomplished. The above-described control procedures repeat upon receiving each subsequent control signal.

After passing through a complete counting cycle for the counter C0, a control signal is set at the counter output OUT. The counter device C2 is synchronized with this control signal. i.e., this counter thus starts a new counting cycle which comprises 48,128 counting steps in accordance with the example above. Given the repetition rate of 2.048 MHz for the counting clock pulse sequence, it follows that a clock pulse sequence whose individual clock pulses appear in periodic repetition with a interval of 23.5 mS is presented by the counter device C2 at a counter output OUT. The repetition rate of these clock pulses thus corresponds with the repetition rate of the synchronization cells received by the interface ATM-S.

In the normal case, with the arrival of synchronization cells having an interval of 23.5 mS, the counting cycle of the counter device C0 as well as the counting cycle of the counter device C2 are set to a value of 48128(D), so that the control signals derived from the synchronization cells each respectively appear at a defined arrival time identified by the microprocessor MP in the above-referenced manner. A fixed phase relationship thus exists between the control signals and the clock pulses output by the counter device C2. When the chronological spacing of the synchronization cells and, thus, the aforementioned phase relationship deviates from this value, then the counting cycle of the counter device C0 is briefly modified by the microprocessor MP according to the detected deviation in order to restore the desired phase relationship. To that end, the microprocessor MP evaluates the arrival times of successive control signals, for example on the basis of a weighted mean value or average.

The present invention was set forth above with reference to the example of a microprocessor circuit in which the arrival times of synchronization cells within an ATM communication system are determined where additional clock signals are available having a fixed phase relationship to the arrival times of the synchronization cells. The present invention, however, is not limited to such an arrangement; rather, it may be employed with the arrival times of control signals which are to be exactly identified or, respectively, when a fixed phase relationship is to be assured between the arrival times and clock signals which are employed. Let it also be pointed out that the counter devices C0, C1 and C2 in the above-described microprocessor circuit are component parts of a counter module type 82C54. These counter devices may be realized with various other similar circuits.

The present invention is subject to many variations, modifications and changes in detail. It is intended that all matter described throughout this specification as shown in the accompanying drawings be considered illustrative only. Accordingly, it is intended that the invention be limited only by the spirit and scope of the appended claims.

What is claimed is:

1. A circuit for determining the arrival times of control signals supplied to a microprocessor comprising:

means for supplying a control signal to the microprocessor;

free-running cycle counter means connected to a bus system of the microprocessor for counting clock pulses occurring periodically with a repetition rate which corresponds to a multiple of a repetition rate of said control signals, said free-running cycle counter means providing a first momentary counter reading upon receiving a read command delivered by the microprocessor via the bus system upon the occurrence of each of said control signals;

triggerable counter means also connected to the bus system for counting said clock pulses only after triggering by said control signal, said triggerable counter means providing a second momentary counter reading upon receiving said read command; and a means in the microprocessor for determining an arrival time of said control signal based on a difference between the first and the second momentary counter readings.

2. The circuit for determining the arrival times of control signals supplied to a microprocessor of claim 1, further comprising an intermediate memory means associated with the free running cycle counter means and the triggerable counter means, for temporarily storing the first and second momentary counter readings.

3. The circuit for determining the arrival times of control signals supplied to a microprocessor of claim 1, further comprising a third counter means connected to the bus system for counting said clock pulses, a counting cycle of the third counter means corresponding to a relationship between the repetition rate of the clock pulses to an average repetition rate of the control signal, the third counter means being synchronized by a count signal output from the free-running cycle counter means at an end of each counting cycle of the free-running cycle counter means.

4. The circuit for determining the arrival times of control signals supplied to a microprocessor of claim 1, wherein the free-running cycle counter means and the triggerable counter means are incorporated into an integrated counter module.

5. A circuit for determining the arrival times of control signals supplied to a microprocessor comprising:

a source of clock pulses;

a means for supplying a control signal to the microprocessor;

free-running counter means connected to a bus system of the microprocessor for counting the clock pulses and providing a first momentary counter reading upon receiving a read command from the microprocessor via the bus system upon the arrival of a control signal;

triggerable counter means connected to the bus system for counting said clock pulses occurring after triggering by the control signal for providing a second momentary counter reading upon receiving the read command; and means in the microprocessor for determining the arrival time of the control signal based on a difference between the first and second momentary counter readings.

6. The circuit for determining the arrival times of control signals supplied to a microprocessor of claim 5, further comprising an intermediate memory means connected to the free running counter means and the triggerable counter means for temporarily storing the first and second momentary counter readings.

7. The circuit for determining the arrival times of control signals through a microprocessor of claim 5, further comprising a bus system counter means connected to the bus system for counting the clock pulses wherein a counting cycle of the bus system counter means corresponds to a relationship between a repetition rate of the clock pulses to an average repetition rate of the control signal, the bus system counter means being synchronized by a count signal emitted by the free-running counter means at an end of each counting cycle of the free-running counter.

8. The circuit for determining the arrival times of control signals supplied to a microprocessor of claim 5, wherein the free-running counter means and the triggerable counter means are incorporated into an integrated counter module.

9. A method for determining the arrival time of a control signal supplied to a microprocessor in a microprocessor system having a free-running counter connected to a bus system of the microprocessor and a triggerable counter connected to the bus system of the microprocessor wherein the method comprises the steps of:

counting clock pulses with the free-running counter;

supplying a control signal to the microprocessor;

triggering the triggerable counter to begin counting clock pulses on the occurrence of the control signal and generating a read command in the microprocessor upon occurrence of the control signal; and generating a first momentary counter reading in the free-running counter and a second momentary counter reading in the triggerable counter upon receiving the read command from the microprocessor.

* * * * *